United States Patent [19]

Thompson

[11] 4,129,069
[45] Dec. 12, 1978

[54] BREATHER BAG APPARATUS

[76] Inventor: Andy L. Thompson, Rte. 2, Courtland, Kans. 66939

[21] Appl. No.: 825,279

[22] Filed: Aug. 17, 1977

[51] Int. Cl.² ............................................. A23P 1/00
[52] U.S. Cl. ................................... 99/646 S; 138/30
[58] Field of Search ........................ 99/646 R, 646 S; 52/192; 98/53–55; 137/203; 220/85 B, 86 R; 237/66; 138/30

[56] References Cited

U.S. PATENT DOCUMENTS

| | | | |
|---|---|---|---|
| 1,597,014 | 8/1926 | Campbell | 237/66 |
| 2,409,964 | 10/1946 | Smith | 138/30 |
| 2,485,232 | 10/1949 | Brown | 137/203 |
| 3,494,274 | 2/1970 | Evers | 99/646 S |
| 3,630,001 | 12/1971 | Hamerski | 99/646 S |

*Primary Examiner*—Leonard D. Christian
*Attorney, Agent, or Firm*—Phillip A. Rein

[57] ABSTRACT

This invention is a breather bag apparatus used with a sealed storage bin such as a silo allowing for expansion and contraction of the air within the sealed structure. This breather bag apparatus is mountable on the sidewall of an existing silo and having a bag member that is readily observable from adjacent the silo to ascertain whether such is operating properly.

4 Claims, 4 Drawing Figures

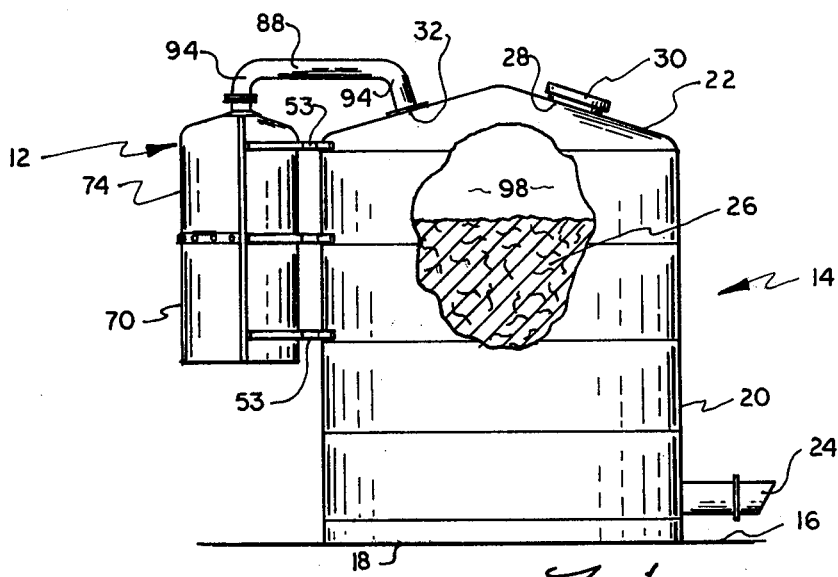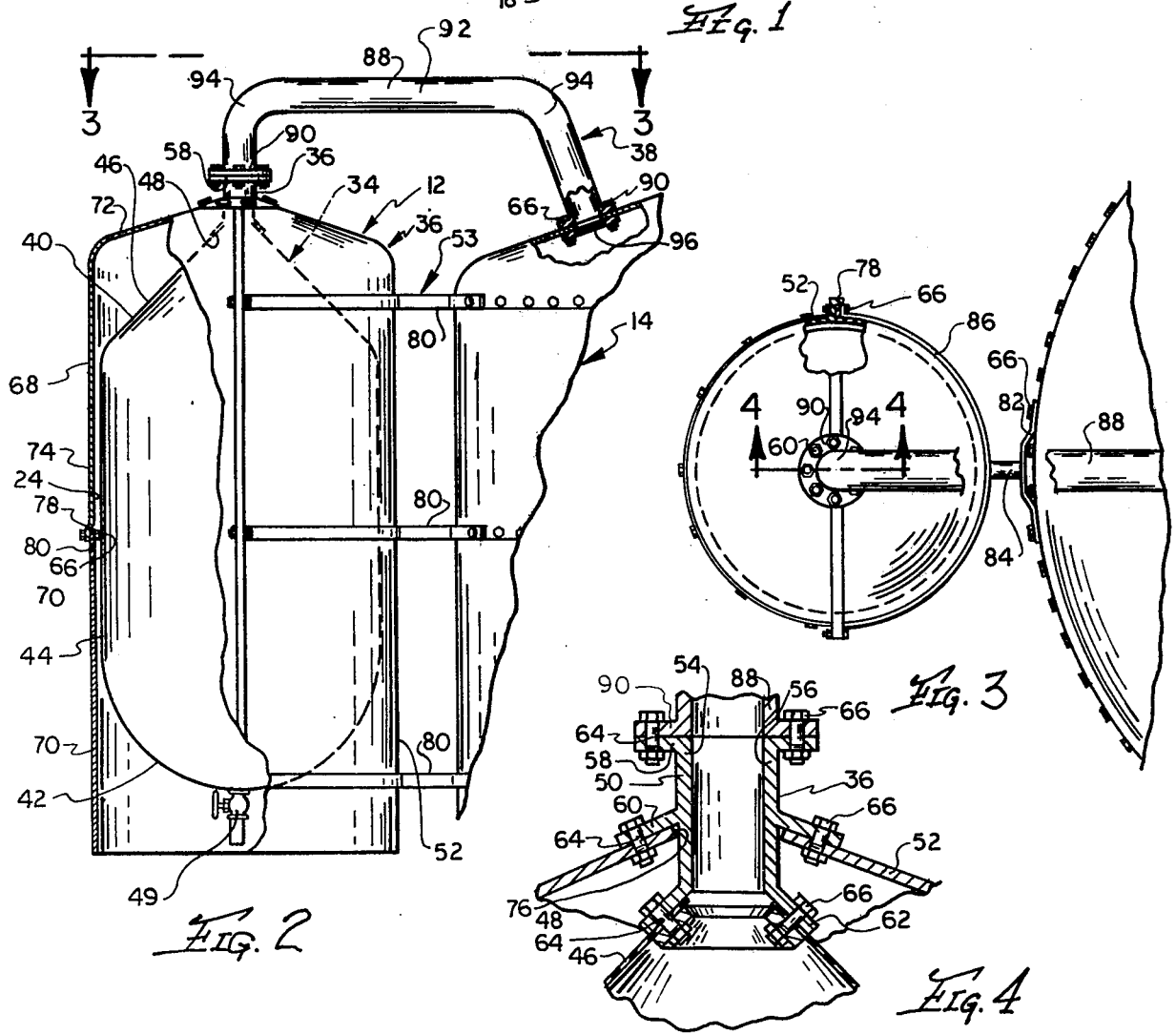

BREATHER BAG APPARATUS

PRIOR ART

It is known in the prior art to provide breather bag devices to regulate pressure within a sealed container. These devices expand and contract due to temperature changes plus any gases produced by material stored in the sealed container. Such prior art devices are shown by the following patents:

| PATENT NO. | INVENTOR | ISSUE DATE |
|---|---|---|
| 2,899,884 | Herbruck | 8-18-59 |
| 3,193,058 | Ebbinghaus | 7-6-65 |
| 3,318,229 | Hansen, Jr. | 5-9-67 |
| 3,494,274 | Evers | 2-10-70 |
| 3,510,319 | Whitaker | 5-5-70 |
| 3,528,360 | Broberg | 9-15-70 |
| 3,630,001 | Hamerski | 12-28-71 |

Most of the patents teach a bag structure that is built into the original storage container such as the Herbruck, Ebbinghaus, Hansen, Jr., Whitaker, and the Broberg references.

The Evers patent teaches an elaborate outer housing having breather bags mounted therein. Similarly, the Hamerski structure has an outer housing with a diaphragm member to allow for expansion and construction of gases.

The applicant's invention is novel in (1) being easily packaged for shipping and assembled at the usage site; (2) connectable to existing silos to provide a breather bag feature; and (3) having an open housing so the condition of the breather bag member can be readily observed.

PREFERRED EMBODIMENT

In one preferred embodiment of this invention, a breather bag apparatus is provided that is readily attached to the sidewall of a storage silo structure. The breather bag apparatus includes a bag assembly mounted within a bag mounting assembly and connected from the bag member to the silo structure by a conduit connector assembly. The bag assembly is a flexible, airtight bag member having an upper inlet opening. The bag mounting assembly includes (1) a support connector assembly connected to the inlet opening of the bag member and the conduit connector assembly; (2) a protector shell member mounted about the bag member and connected to the support connector assembly; and (3) a support bracket assembly is connected to the protector shell member and a sidewall of the silo structure to add sufficient rigidity. The support connector member includes a central support tube having connected thereto (1) an upper conduit support flange to connect to the conduit connector assembly; (2) a central shell support flange connected to the protector shell member; and (3) a lower bag support flange to connect to the bag member so as to direct gases from the bag member through the support tube and conduit connector assembly to the silo structure. The protector shell member is of a bottle shape without a bottom wall and surrounds the bag member. The support bracket assembly includes connector arms, support straps, and mounting brackets to support the protector shell member adjacent the silo structure. The conduit connector assembly includes a conduit member having connector flanges at opposite ends and a plurality of nut and bolt members are used to connect one connector flange to the conduit support flange of the support connector member and the other connector flange is secured to the silo structure about an inlet opening or hole. The conduit member acts to permit free flow of air and gases between the silo structure and the bag member to permit expansion and contraction thereof.

OBJECTS OF THE INVENTION

One object of this invention is to provide a breather bag apparatus that is simple in construction and easily assembled and connected to existing silo structures.

One other object of this invention is to provide a breather bag apparatus having an outer protector shell member enclosing and protecting a flexible, expandable bag member.

Another object of this invention is to provide a breather bag apparatus having a breather bag member enclosed by a protector shell member, and the shell member does not have a bottom wall whereby the condition of the breather bag member is readily observable.

Still, one further object of this invention is to provide a breather bag apparatus that is durable in construction, easy to assembly and connect to an existing silo structure, and dependable in operation.

Various other objects, advantages, and features of the invention will become apparent to those skilled in the art from the following discussion, taken in conjunction with the accompanying drawings, in which:

DRAWINGS

FIG. 1 is a side elevational view of a silo structure having a breather bag apparatus of this invention connected thereto;

FIG. 2 is an enlarged side elevational view of the breather bag apparatus and the silo structure having portions thereof broken away for clarity;

FIG. 3 is a fragmentary sectional view taken along line 3—3 in FIG. 2; and

FIG. 4 is an enlarged fragmentary sectional view taken along line 4—4 in FIG. 3.

The following is a discussion and description of preferred specific embodiments of the new breather bag apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

In referring to the drawings in detail and, in particular to FIG. 1, a breather bag apparatus of this invention, indicated at 12, is illustrated as connected to a silo structure 14 which is supported on a ground surface 16.

The silo structure 14 is of a conventional nature having a bottom wall 18, a cylindrical sidewall 20, and an integral, inclined top wall 22. The sidewall 20 is formed with a discharge tube 24 to remove material, indicated at 26, such as corn, wheat, etc. from the silo structure 14. The top wall 22 is formed with an inlet opening 28 covered with an airtight cap 30 through which the material 26 is added to the silo structure 14. A second opening 32 is formed in the top wall 22 and connected to the breather bag apparatus 12 in a manner to be explained.

The breather bag apparatus 12 includes a bag assembly 34 mounted within a bag mounting assembly 36 which, in turn, is connected to the silo structure 14 by a conduit connector assembly 38. The bag assembly 34 consists of a bag member 40 preferably constructed of an airtight nylon material. The bag member 40 resembles an oblong balloon having a bottom wall 42 integral with a sidewall 44 which, in turn, is integral with an inclined top wall 46. The uppermost portion of the top wall 46 defines an inlet opening 48 which is secured to a portion of the bag mounting assembly 36. The bottom wall 42 has a drainage valve 49 which can be opened to drain any accumulated fluids from the bag member 40.

As shown in FIGS. 2 and 4, the bag mounting assembly 36 includes a support connector member 50 connected to a downwardly depending protector shell member 52 which is connected to the silo structure 14 by a support bracket assembly 53. The support connector member 50 includes a central support tube 54 having a central opening 56 and depending outwardly therefrom (1) a top conduit support flange 58; (2) a central shell support flange 60; and (3) a bag support flange 62. Each of the above flanges are formed with spaced holes 64 about its periphery for connection by nut and bolt members 66 to various items as will be explained.

The protector shell member 52 is preferably of a fiberglass construction and formed in two sections being an upper shell dome section 68 and a lower shell wall section 70. The shell dome section 68 includes a top wall 72 integral with a cylindrical sidewall portion 74 and is formed in half sections for ease of conveyance and shipping. The top wall 72 is formed with a central hole 76 to be connected by the nut and bolt members 66 to the shell support flange 60 as shown in FIG. 4. A lower peripherial edge of the sidewall portion 74 is formed with an offset lip section 78 to be connected by nut and bolt members 66 to an upper edge portion 80 of the lower shell wall section 70 (FIG. 2).

The shell wall section 70 resembles an open cylinder also formed in two half sections for ease of conveyance and shipping and extends downwardly beyond the breather bag member 40 to provide protection thereto.

The support bracket assembly 53 includes three, spaced connector assemblies 80 each including (1) a mounting bracket 82 secured by nut and bolt members 66 to the silo structure 14; (2) a connector arm 84 having one end connected to the mounting bracket 82; and (3) a C-shaped support strap 86 to contact a half section of the protector shell member 52 and secured thereto with nut and bolt members 66.

The conduit connector assembly 38 includes a conduit member 88 having conduit connector flanges 90 secured to each outer ends thereof which, in turn, are secured by the nut and bolt members 66 to adjacent structures. More particularly, the conduit member 88 includes a main body 92 having outer end portions formed into inclined end sections 94. One conduit connector flange 90 is connected by the nut and bolt members 66 to the conduit support flange 58 of the support connector member 50. The other one of the conduit connector flanges 90 is connected by the nut and bolt members 66 to the top wall 22 of the silo structure 14 about the second opening 32. A screen member 96 is bolted with the other conduit connector flange 90 to prevent material 26 within the silo structure 14 from being carried into the breather bag member 40.

USE AND OPERATION OF THE INVENTION

In the use and operation of the breather bag apparatus 12 of this invention, it is noted how the protector shell member 52 is constructed of four sections for ease of crating and shipping to the desired location. It is obvious that the conduit member 88 could be supplied in sections if desired. The assembly procedure of the breather bag apparatus 12 is obvious in light of the description and drawings submitted herein.

It is seen that the interior space of the silo structure 14, indicated generally at 98, is connected by the conduit member 88 to the interior of the bag member 40 in a sealed manner. This provides free flow of air and gases therebetween to allow compensation for differences in atmospheric pressure and that created in the silo structure 14.

It has been known that air stored feed do not mix as oxidation would occur with rapid spoilage of the feed material. The problem solved by this invention is to compensate for increased pressures in the silo structure 14 created by temperature during the sunlight hours. At night, the cool temperature created a vacuum type pressure on the walls of the silo structure 14 creating more potential damage.

The breather bag apparatus of this invention is simple to construct, easy to assemble, constructed of durable and corrosion resistant meterials, and reliable in operation. The open bottom wall of the protector shell member allows one to observe the condition of the bag member as a completely collapsed bag member would indicate a leak in the system.

While the invention has been described in conjunction with preferred specific embodiments thereof, it will be understood that this description is intended to illustrate and not to limit the scope of the invention, which is defined by the following claims:

I claim:

1. A breather bag apparatus connected to a material storage structure operable to allow for expansion and contraction of gases in the storage structure, comprising:
   (a) a bag assembly having a flexible bag member that expands and contracts under gaseous pressures;
   (b) a bag mounting assembly secured to the storage structure and surrounding said bag member in a protective manner;
   (c) a conduit connector assembly connected at one end to said bag member and at another end to the storage structure to provide free flow of gases therebetween;
   (d) said bag mounting assembly including a support connector member and a protector shell member connected to said support connector member;
   (e) said support connector member connected to said bag member and said conduit connector assembly for flow of gases therebetween;
   (f) said protector shell member encloses said bag member on all sides thereof without a bottom wall; and wherein said bag member acts similar to a diaphragm member to equalize pressures between the atmosphere and interior of the storage structure and prevent air from entering the silo structure and said bag member is protected on all sides and top thereof but said bag member is readily observed from below to monitor condition thereof.

2. A breather bag apparatus as described in claim 1, wherein:
   (a) said bag member including a valve member at a lower area thereof used to selectively drain any collected, condensed fluids therefrom periodically.

3. A breather bag apparatus as described in claim 1, wherein:
(a) said protector shell member is constructed in quarter sections bolted together to form a dome structure; and
(b) said protector shell member constructed of a fiberglass material.

4. A breather bag apparatus as described in claim 1, wherein:
(a) said bag mounting assembly having a support bracket assembly secured to said protector shell member and the storage structure; and
(b) said support bracket assembly including a mounting bracket secured to the storage structure, a support strap connected to said protector shell member, and a connector arm secured to said mounting bracket and said support strap.

* * * * *